(12) United States Patent  (10) Patent No.: US 7,673,461 B2
Cameriano et al.                (45) Date of Patent:     Mar. 9, 2010

(54) STRUCTURAL TURBINE ENGINE CASING

(75) Inventors: Laurent Bernard Cameriano, Avon (FR); Nicolas Pierre-Marie Girard, Paris (FR)

(73) Assignee: SNECMA, Paris (FR)

( * ) Notice: Subject to any disclaimer, the term of this patent is extended or adjusted under 35 U.S.C. 154(b) by 734 days.

(21) Appl. No.: 11/519,915

(22) Filed: Sep. 13, 2006

(65) Prior Publication Data

US 2007/0068136 A1    Mar. 29, 2007

(30) Foreign Application Priority Data

Sep. 29, 2005   (FR) .................................. 05 09927

(51) Int. Cl.
F02C 7/20 (2006.01)
F02K 3/04 (2006.01)

(52) U.S. Cl. .......................... 60/797; 60/796; 60/226.1; 60/805; 415/142

(58) Field of Classification Search ................... 60/796, 60/797, 226.1, 226.2; 415/142, 194, 195
See application file for complete search history.

(56) References Cited

U.S. PATENT DOCUMENTS

| 2,928,648 | A | | 3/1960 | Haines et al. | |
| 2,936,999 | A | * | 5/1960 | Jacobus et al. | 415/134 |
| 3,403,889 | A | * | 10/1968 | Ciokajlo | 415/220 |
| 4,785,625 | A | * | 11/1988 | Stryker et al. | 60/226.1 |
| 4,793,770 | A | * | 12/1988 | Schonewald et al. | 415/142 |
| 4,987,736 | A | | 1/1991 | Ciokajlo et al. | |
| 5,088,279 | A | | 2/1992 | MacGee | |
| 5,272,869 | A | * | 12/1993 | Dawson et al. | 60/796 |
| 7,124,572 | B2 | * | 10/2006 | Aycock et al. | 60/39.511 |

FOREIGN PATENT DOCUMENTS

| EP | 1 247 944 A2 | 10/2002 |
| FR | 2 641 328 | 7/1990 |
| FR | 2 681 401 | 9/1992 |
| JP | 9-324699 | 12/1997 |

* cited by examiner

*Primary Examiner*—Ted Kim
(74) *Attorney, Agent, or Firm*—Oblon, Spivak, McClelland, Maier & Neustadt, L.L.P.

(57) ABSTRACT

A structural turbine engine casing is disclosed. The casing includes a central hub, at least one intermediate shroud, and an external ring, which are concentric, the external ring and the intermediate shroud being connected via links, the intermediate shroud and the central hub being connected by a series of radially fastened hollow arms. The series of arms includes at least one main arm and at least one secondary arm, each main arm being arranged in the continuation of a link and having a mass which is greater than that of a secondary arm arranged at a distance from the links.

10 Claims, 6 Drawing Sheets

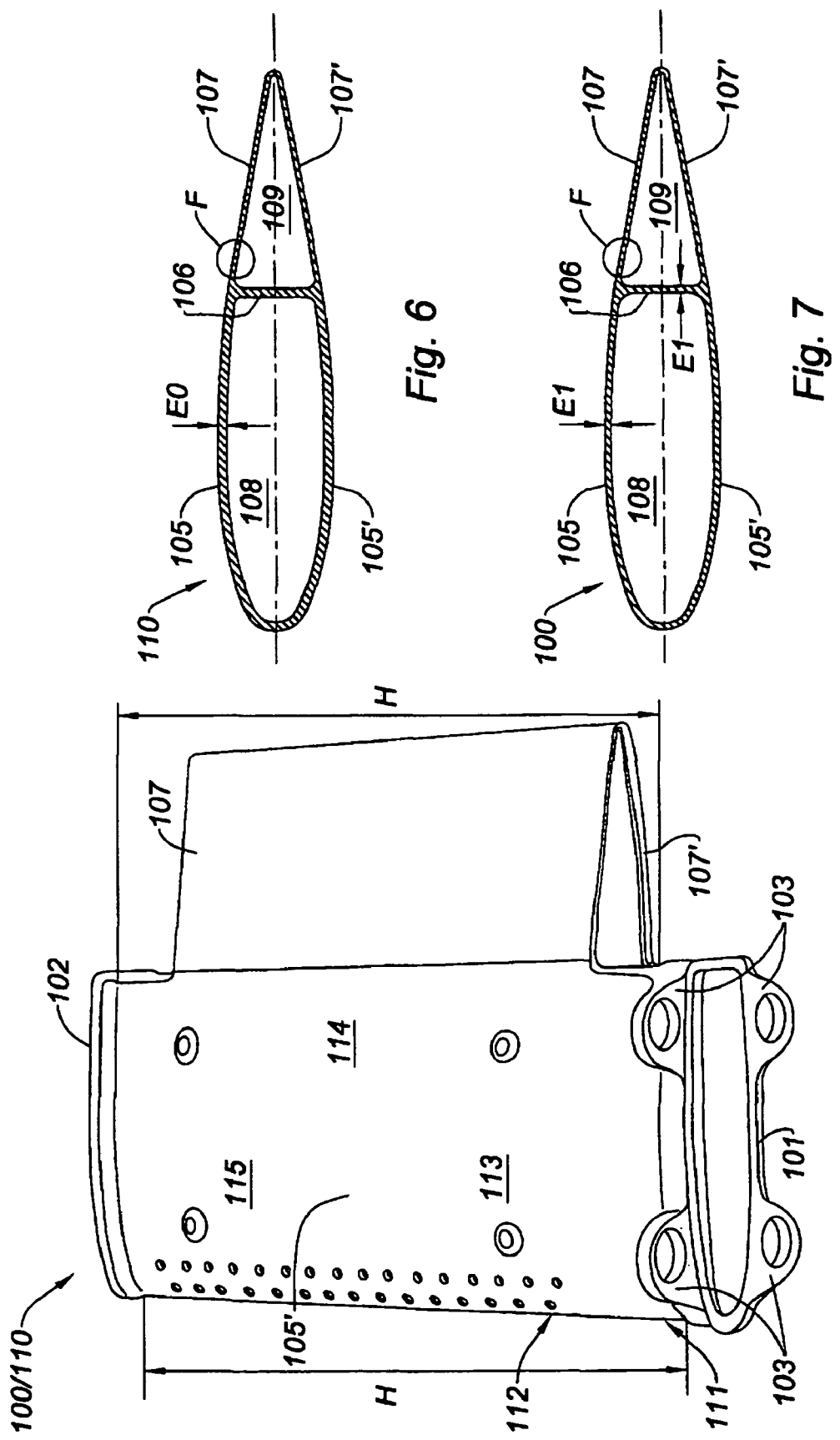

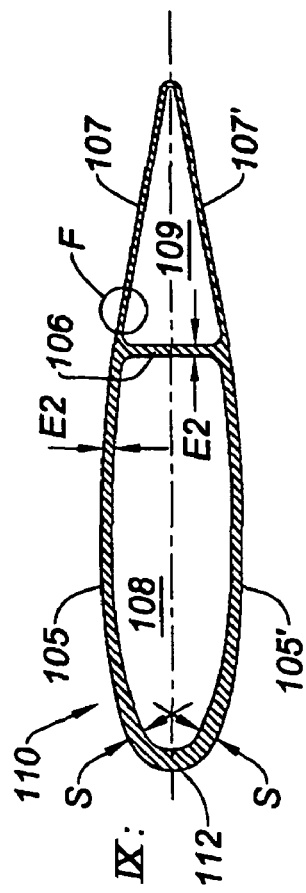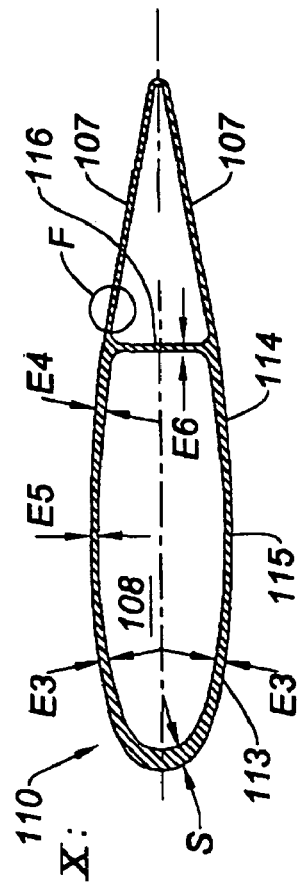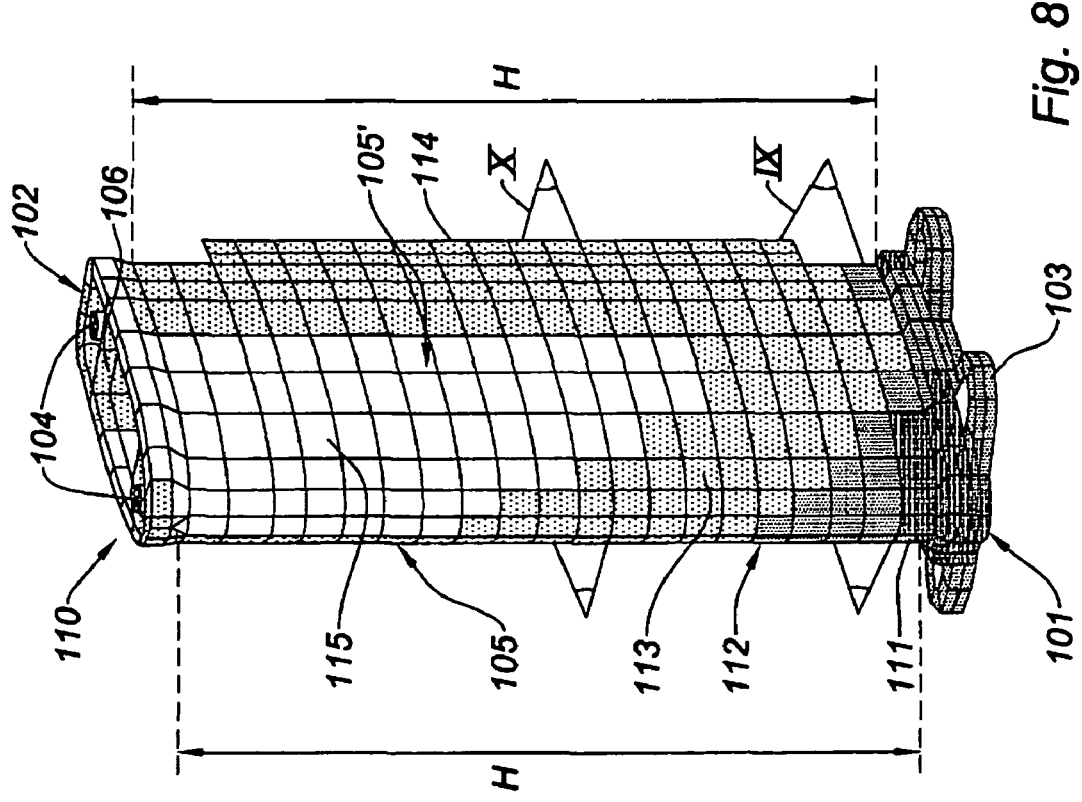

STRUCTURAL TURBINE ENGINE CASING

BACKGROUND OF THE INVENTION AND DESCRIPTION OF THE PRIOR ART

The present invention relates to a structural casing for supporting rotating parts of a turbine engine, in particular of a turbojet.

As illustrated in FIG. 1, a turbine engine 1 generally comprises a tubular enclosure 2, containing rotating bodies, such as compressor stages 3-4 and turbine stages 5-6, mounted on one or more rotating shafts 7 arranged axially in the enclosure 2 of the turbine engine, which constitutes a stator.

The structure of a turbine engine 1 includes structural casings 8 and 9 which support the shaft or shafts 7 in rotation. These casings are connected to the aircraft via suspension parts (pylon, strut, attachments or links).

A turbine engine 1 includes at least two structural casings 8 and 9: an intermediate casing which supports rotation bearings at the front of the rotating shaft 7 and an exhaust casing 9 which supports rotation bearings at the rear of the rotating shaft 7.

The casings 8 and 9 have the function of suspending the rotating bodies 3 to 7 of the engine in the stator 2, of immobilizing the rotation bearings and of transmitting the mechanical loads of the bearings toward the stator 2.

Documents FR-A-2 641 328, FR-A-2 681 401 and JP-A-9-324 699 show examples of structures of turbine engine casings.

As illustrated in FIG. 2, a structural turbine engine casing 9 of known type comprises a central hub 10 serving as a bearing support, an intermediate annular shroud 20 and an external ring 30, which are concentric to the central hub 10. The central hub 10 and the intermediate shroud 20 are connected fixedly and rigidly by a series of multiple arms 11 to 19 (numbering nine here) arranged radially. The intermediate shroud 20 and the external ring 30 are connected in an articulated manner by means of suspension links 22. These links 22 serve to transmit the mechanical loads (landings, steering maneuvers, thrust, engine unbalance) between the hub 10, the arms 11-19, the intermediate annular part 20 and the external annular part 30. The structural arms 11-19 have a profiled hollow structure which is dimensioned to withstand these mechanical loads.

The disadvantage is that the dimensioning of the hollow arms of the known structural casings does not allow them to withstand large mechanical loads over a prolonged period.

However, a constant objective in aeronautics is to reduce the mass of the component parts of aircraft without harming their performance.

SUMMARY OF THE INVENTION

The object of the invention is to optimize the shape of the parts of the casing so as to increase the life of these parts, while limiting their mass.

To make this possible, provision is made according to the invention for the casing to comprise two types of structural arms: the main arms are arranged radially in the continuation of the links and therefore bear the major part of the load and of the forces exerted by the engine. The secondary arms are distanced from the links and bear relatively less mechanical loading than the main arms. The invention makes provision, on the one hand, to lighten the secondary arms by reducing their wall thickness with respect to the main arms and, on the other hand, to optimize the geometry of the main arms by increasing their wall thickness in the regions of maximum stresses and by reducing, where appropriate, their wall thickness in the regions of minimum stresses.

The invention relates to a structural turbine engine casing comprising a central hub, at least one intermediate shroud and an external ring, which are concentric, the external ring and the intermediate shroud being connected via links, the intermediate shroud and the central hub being connected by a series of radially fastened arms, the series of arms comprising at least one main arm and at least one secondary arm, each main arm being arranged in the continuation of a link and having a mass which is greater than that of a secondary arm arranged at a distance from the links.

Provision is made for each main arm to have, in at least one transverse section, a wall thickness which is greater than the wall thickness of a secondary arm.

Preferably, each main arm includes at least one region having a wall thickness which is greater than the thickness of the walls of the remainder of the arm.

Advantageously, the main arm has a progressive reduction in wall thickness between the region of greater thickness and the remainder of the arm.

By way of illustration, the secondary arms have side walls whose thickness is around 70% of the thickness of the walls of a main arm.

Provision is made for the hollow arms to comprise, downstream of the main body, fins forming a trailing edge, the fin walls having a thickness which is smaller than the thickness of the walls of the main body of the arm.

The invention also relates to a turbine engine comprising such a structural casing.

BRIEF DESCRIPTION OF THE DRAWINGS

Other particulars or advantages of the invention will become clearly apparent from the remainder of the description, which is given by way of nonlimiting example and with reference to the appended drawings, in which:

FIG. 5 is a side and bottom view of a structural casing arm according to the invention;

FIG. 6 is a cross section of a main structural casing arm according to the invention;

FIG. 7 is a cross section of a lightened secondary structural arm according to the invention;

FIG. 8 is a perspective view of an upstream portion (main body) of a main arm showing the location of the regions subjected to the most mechanical stresses;

FIG. 9 is a cross section of a main arm having an increased wall thickness in a region of high stresses, according to a second embodiment of the invention; and FIG. 10 is another cross section of a main arm having an optimized shape, with a region of increased thickness and a narrowed region, according to a third embodiment of the invention.

DESCRIPTION OF THE PREFERRED EMBODIMENTS

Figure 3:
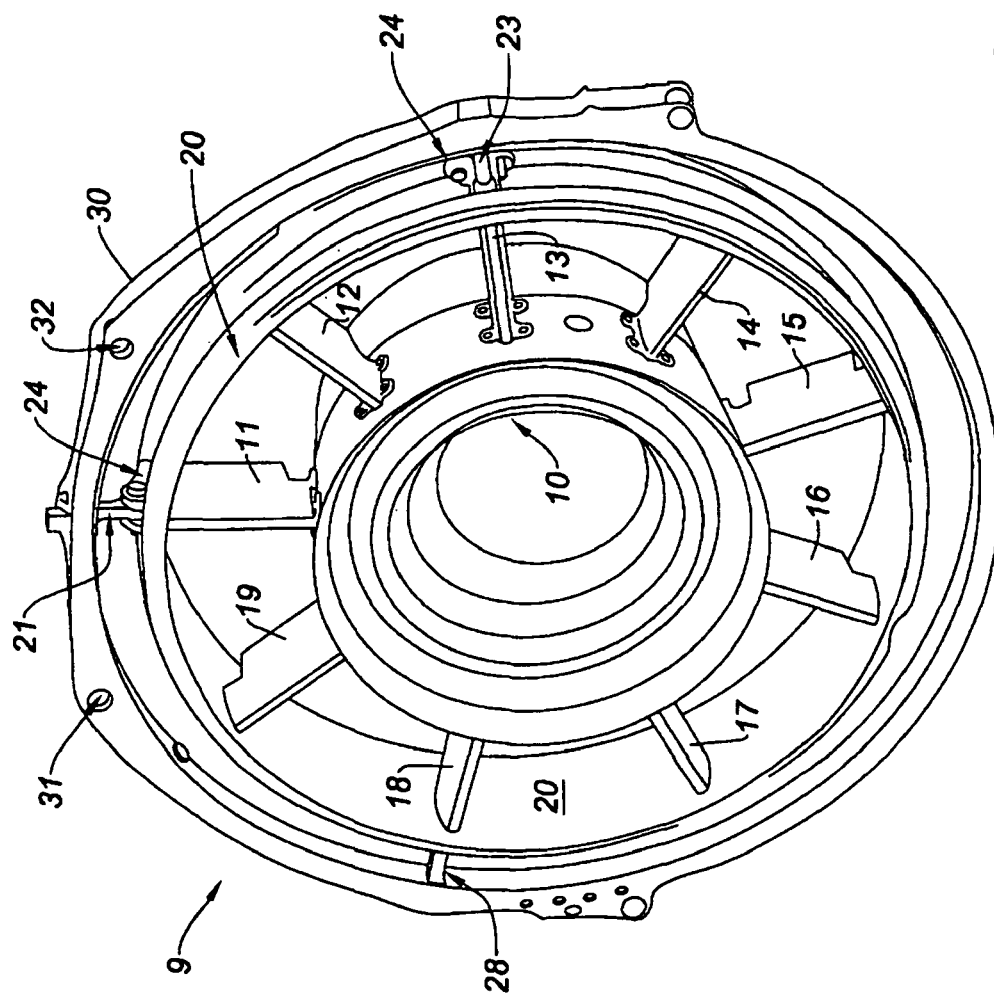
FIG. 3 is a perspective view of a structural casing according to the invention.

FIG. 3 shows a structural exhaust casing 9 according to the invention, comprising a circular central hub 10, an external peripheral ring 30 and an intermediate annular shroud 20. The parts 10, 20, 30 are concentric and can be entirely of revolution or not, in particular of polygonal shape.

The external ring 30 and the intermediate shroud 20 are connected by suspension links 21, 23, 28, numbering three here.

Figures 4A, 4B:
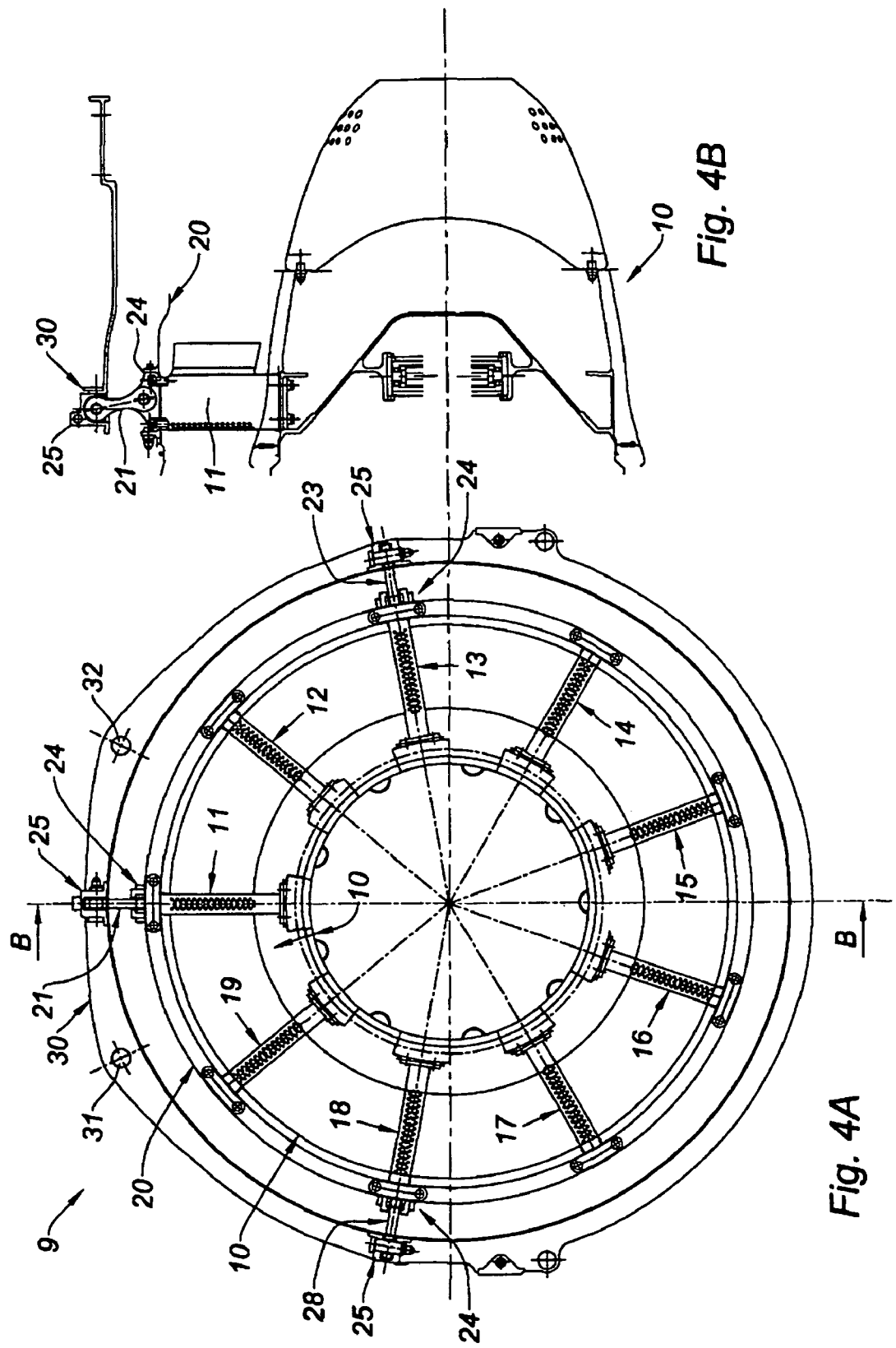
FIG. 4A is an axial rear view of a structural casing according to the invention.
FIG. 4B is a view in axial section of the casing of FIG. 4A on the vertical plane B-B (at "12 o'clock")

Each link 21, 23, 28 is mounted in an articulated manner on two pivots whose pivot pins are transverse with respect to the axial direction of the casing, as illustrated in more detail in FIGS. 4A and 4B. The two pivots are engaged in crevices 24 and 25 which are fixed to the intermediate shroud 20 and to the external ring 30, respectively.

The angular position of the links 21, 23, 28 is optimized so as to reduce the loads in the intermediate shroud 20. According to the exemplary embodiment of the casing shown in FIGS. 3 and 4A, the three links 21, 23, 28 are respectively positioned at angles of about 0°, 80° and −80° with respect to the vertical ("12 o'clock" direction as viewed along the axis of the turbine engine casing).

The central hub 10 is fastened to the shroud 20 via structural arms 11 to 19 which are arranged radially in a star formation between the hub 10 and the intermediate shroud 20.

In the exemplary embodiment shown in FIGS. 3 and 4A, the radial arms 11 to 19 number nine and are distributed uniformly at angles of about 0°, ±40°, ±80°, ±120° and ±160° with respect to the vertical. The arms are of two types: the main arms 11, 13 and 18 situated at 0°, 80° and −80° (with respect to the vertical) are located in the direct continuation of the suspension links 21, 23 and 28. These main arms 11, 13, 18 therefore bear the major part of the mechanical loads resulting from the weight, the thrust and the steering maneuvers. The other six arms 12, 14, 15, 16, 17, 19, situated at ±40°, ±120°, ±160°, are distanced from the suspension arms and bear relatively less mechanical loading. These less loaded arms form the secondary arms.

FIGS. 5 to 10 show that the arms 100, 110 have a hollow structure extending between a base portion 101, here comprising four attach tabs 103 for fastening to the hub 10, and a top portion 102, here comprising two screw threads 104 for fastening the arm to the intermediate shroud 20.

As illustrated in FIGS. 5 to 10, each arm 100/110 is formed by a main body having two side walls 105 and 105'. The cross section of the arms has approximately the shape of an ellipse truncated by a transverse partition 106 which joins the two side walls 105 and 105' of the arm. The two side walls 105, 105' of the arm are continued rearwardly by two walls 107, 107' which join together to form a trailing fin in the continuation of the arm. The arm 100 or 110 thus has a transverse profile approximating to a symmetrical hollow wing profile comprising two cavities 108 and 109 separated axially by a transverse partition 106. The two walls 107 and 107' of the fin have a reduced thickness with respect to the walls of the main body.

According to the invention, the walls of the secondary arms 12, 14, 15, 16, 17 and 19 are narrowed with respect to the walls of the main arms 11, 13 and 18.

In a first embodiment illustrated in FIG. 6, the body of the main arm 110 has walls of constant thickness E0 over virtually its full height H, with the exception of the base 101 and the top 102 (the fin retains a reduced wall thickness, smaller than E0).

FIG. 7 shows a transverse section through a secondary arm 100 whose walls 105, 105' and 106 are narrowed to a reduced thickness E1. The reduction in thickness of the secondary arm walls may be around a quarter to a half of the thickness of a main arm.

Examples of the thickness of the walls of structural arms are given in table I below.

Preferably, all the walls 105, 105' and 106 around the anterior cavity 108 of each secondary arm 100, that is to say the walls of the side faces 105-105' and of the transverse partition 106, have such a reduced thickness E1. The walls 107-107' of the fin at the rear of the body of the arm 100 also have a reduced thickness F, in particular one which is equal to or smaller than E1.

Advantageously, it is thus possible to obtain on each arm a weight saving which may amount to about a third of the mass of an arm.

Figure 1:
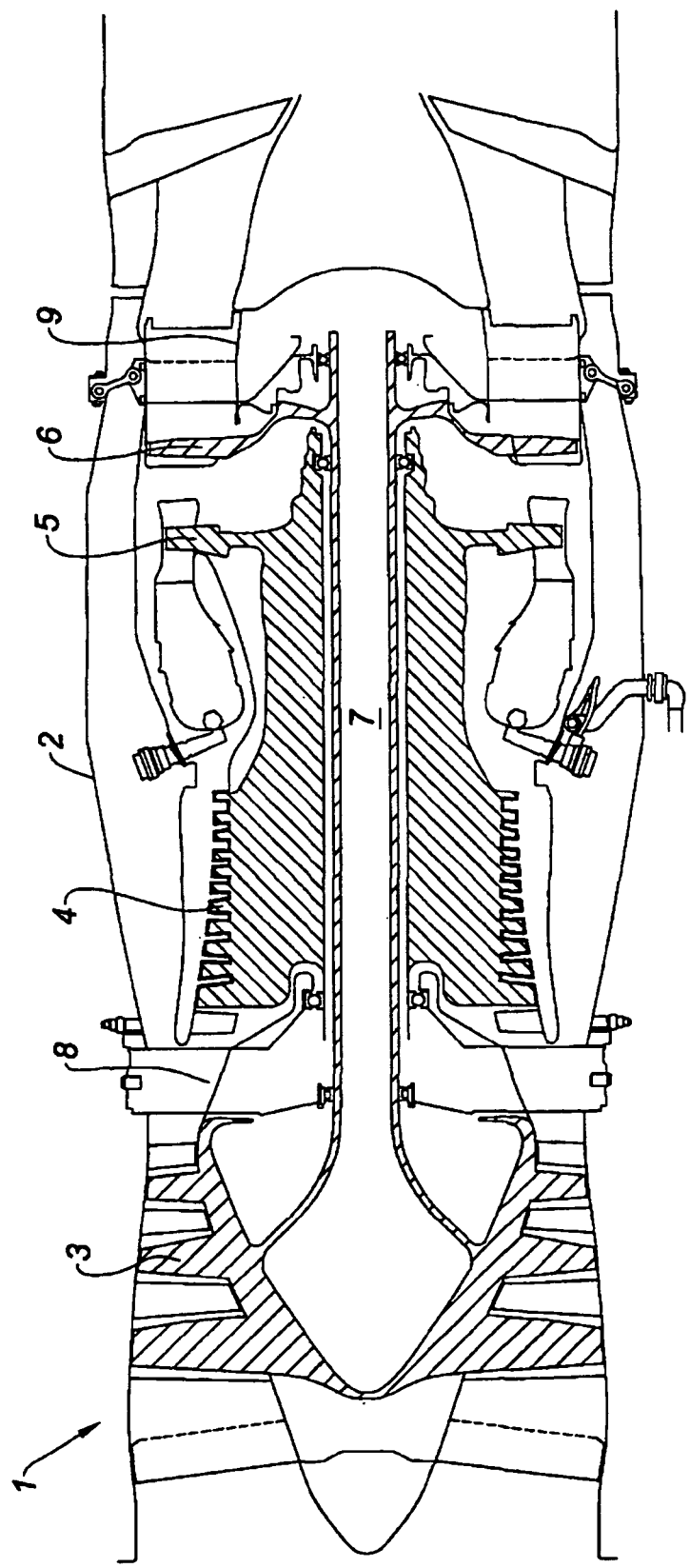
FIG. 1 is a view in axial section of a turbine engine comprising structural casings.
Figure 2:
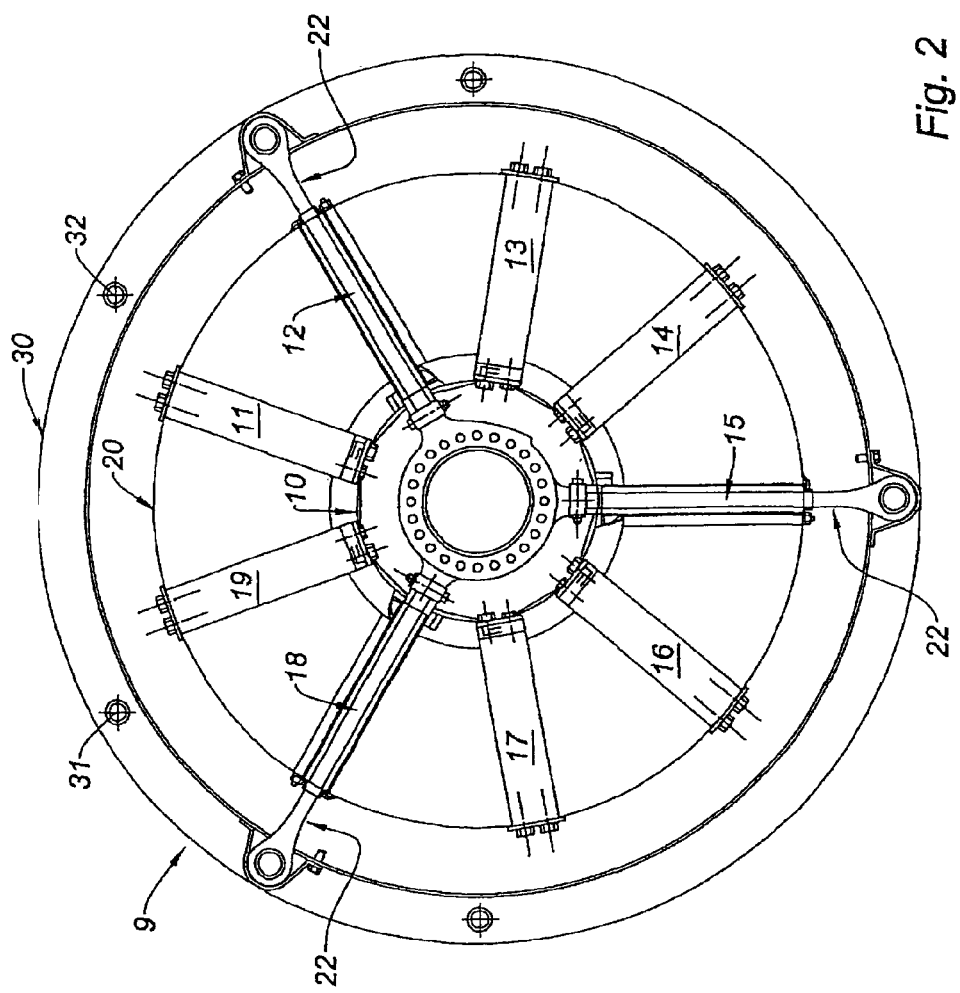
FIG. 2 is an axial front view of a structural casing according to the prior art.

When applied to the six secondary arms 12, 14, 15, 16, 17, 19 arranged at a distance from the links 21, 23, 28 according to the configuration of FIGS. 2 and 3, a wall thickness reduction of 30% leads to a weight saving corresponding approximately to the mass of two arms.

Thus, in a casing 9 according to the invention, the secondary arms 12, 14, 15, 16, 17, 19 have a wall thickness which is smaller than the wall thickness of the main arms 11, 13 and 18, the thickness of the walls 105 of the arms being substantially constant over the greatest part of the height H of the arms. By way of nonlimiting example, the main arms 11, 13, 18 may have a wall thickness of around one millimeter and the secondary arms 12, 14, 15, 16, 17, 19 may have a wall thickness of around 0.7 mm.

FIGS. 8 to 10 show other embodiments of main arms 110 in which the geometry of the arms is optimized as a function of the mechanical stresses borne locally by the main arms.

FIG. 8 shows a perspective view of a main arm 110 on which a speckled grid pattern emphasizes the regions where the maximum stresses are concentrated (density of dots increasing with the stress level).

In the example of FIG. 8, the arm has a number of stress regions: the working regions are essentially, in this case, the regions situated along the leading edge 112 and the regions situated at the rear of the arm, in particular the transverse partition 106 and the flanks 114 (side walls of the arm) situated in the vicinity of the partition 106. The maximum stresses are concentrated, according to the example of FIG. 8, in the lower portion of the arm 110, at the base 111 of the leading edge and along the periphery of the base 101 (below the transverse plane IX).

According to the invention, provision is made to locally increase the thickness of the walls of each main arm in the most loaded regions and, where appropriate, to reduce the thickness of the walls of the arm in the least loaded regions.

Thus, in a second embodiment of the main arm 110 represented in FIG. 9, the walls have an increased thickness S in the region 111-112 of maximum stresses, which extends here at the lower portion of the leading edge and is continued over the periphery of the base 101 and/or along the leading edge 112 of the arm 110.

In this region 111 of maximum stress, the main arm has a wall thickness S which is greater than the wall thickness E2 in the remainder of the tubular portion 105 of the arm, this increased thickness possibly amounting to twice or three times the wall thickness in the region of minimum stress.

Table I below gives examples of the thickness of the walls of the main arm according to the second embodiment of the invention.

The main arm 110 may thus have an excess thickness S in the region 111 of maximum stress, the remainder of the tubular portion of the arm having a constant thickness E2.

Advantageously, the addition of excess material S, representing around one to a few percent (typically 2% or less) of the total mass of the main arm 110, in the most loaded region 111 of the arm makes it possible to reduce the level of maximum stress borne by the walls of the arm 110 by one or more tens of percent in this region (the stress level is typically lowered by about 20%).

The key advantage of such a reduction in the stress level is to double or even triple the expected life of the main arms.

FIG. 8 also shows that the tubular walls 105 of the main arm 110 have a region of minimum stress 115 which extends, taking the example of FIG. 8 here, over a fraction of between a quarter and three quarters of the walls, in the upper and anterior portion 115 of the arm going toward the leading edge. There can be seen regions of median stresses 113-114 covering a lower section 113 of the arm and the whole of a posterior section 114 of the arm going toward the partition 106.

According to a third embodiment illustrated in FIG. 10, the thickness of the walls of the main arm 110 in the region of minimum stress 115 is narrowed to a reduced value E5 which is less than the wall thickness value E3 in the region of median stress 113, the thickness E3 itself being smaller than the increased wall thickness S in the region of maximum stress 111-112.

In the region of minimum stress 115 typically covering half the surface of the walls of the arm, the wall thickness E5 may be reduced by a quarter or by half with respect to the thicknesses E3 and E4 of the walls of the arm in the regions of average stresses 113 and 114, while the region of maximum stress has a thickness S of around 100% to 200% of the thicknesses E3 and E4.

Table I below gives examples of the thickness of the main arm according to the third embodiment of the invention.

Casting and forging techniques advantageously make it possible to obtain structural arms having progressive transitions (reduction or increase) in the wall thicknesses.

The arms are preferably made of metal, in particular of a nickel-based metal alloy.

Advantageously, a main arm having a narrowed wall thickness over its full height, with the exception of a reinforcing region 111 surrounding the base of the arm and extending along the leading edge, again provides a saving in mass of around 15%; that is, for three main arms, a weight saving of around a third to a half of the mass of an arm.

Over the whole of the casing, the reduction in the thickness of the walls of the secondary arms and the optimization of the profile of the walls of the main arms thus provide a weight saving which is greater than twice the mass of an arm, this weight saving possibly representing three times the mass of a secondary arm according to the invention.

The invention claimed is:

1. A structural turbine engine casing comprising,
a central hub;
at least one intermediate shroud;
an external ring;
links which are pivotally connected to the external ring and the intermediate shroud; and
a series of radially fastened hollow arms which connect the intermediate shroud and the central hub,
wherein the central hub, the intermediate shroud, and the external ring are concentric about an axial direction,
wherein the series of arms comprises at least one main arm and at least one secondary arm, each main arm being arranged in the continuation of a link and having a mass which is greater than that of a secondary arm arranged at a distance from the links,
wherein a length of the main arm and a length of the secondary arm in the axial direction is the same, and
wherein each arm comprises a hollow main body which includes a leading edge and side walls, and wherein each main arm includes a wall thickness which is greater than a wall thickness of each secondary arm across at least one transverse section.

2. The casing as claimed in claim 1, wherein each main arm includes at least one region with a wall thickness which is greater than the thickness of the walls of the remainder of the main arm.

3. The casing as claimed in claim 2, in which the main arm has a progressive reduction in wall thickness between the region of greater thickness and the remainder of the arm.

TABLE I

Examples of thicknesses of the walls of structural arms, expressed as a percentage with respect to the reference thickness E0

| Thickness | Leading edge 112 | | Side walls 105 | | Partition 106 | Fins 107 |
|---|---|---|---|---|---|---|
| Secondary arm (according to the invention) | 50% to 100% (typ. E1 = 70% E0) | | 50% to 100% (typ. E1 = 70% E0) | | 50% to 100% (typ. E1 = 70% E0) | (typ. F = 70% E0) |
| Main arm (first embodiment) | 100% (E0) | | 100% (E0) | | 100% (E0) | (typ. F = 70% E0) |
| Main arm (second embodiment) | 100% to 200% (typ. S = 150% E0) | | 100% (E2 = E0) | | 100% (E2 = E0) | (typ. F = 70% E0) |
| Main arm (third embodiment) | 100% to 200% (typ. S = 150% E0) | Region 113 E3 varies between S and E5 | Region 115 50% to 100% (typ. E5 = 70% E0) | Region 114 50% to 150% (typ. E4 = E0) | 50% to 150% (typ. E6 = E0) | (typ. F = 70% E0) |

4. The casing as claimed in claim 1, wherein the wall thickness of the secondary arms is substantially 70% of the wall thickness of each main arm.

5. The casing as claimed in claim 1, wherein each hollow arm comprises, downstream of the main body, fin walls forming a trailing edge, the fin walls including a thickness which is smaller than the wall thickness of the main body of the arm.

6. The casing as claimed in claim 1, wherein each link is articulated on two pivot pins which are fixed to the external ring and to the intermediate shroud, respectively, the pivot pins being transverse with respect to the axial direction of the casing.

7. A turbine engine which comprises at least one structural casing as claimed in claim 1.

8. The casing as claimed in claim 1, wherein a wall thickness of a leading edge of each main arm is greater at a base portion of the main arm disposed closer to the central hub.

9. The casing as claimed in claim 1, wherein a wall thickness of a leading edge of each main arm decreases along a radial direction from a base portion of the main arm to a top portion of the main arm.

10. The casing as claimed in claim 1, wherein the wall thickness of the side walls of each second arm has a reduction in thickness of 25% to 50% of the wall thickness of the side walls of each main arm.

* * * * *